United States Patent [19]
Huber

[11] Patent Number: 5,231,352
[45] Date of Patent: Jul. 27, 1993

[54] POWER ACTUATOR INCLUDING MAGNETIC POSITION DETECTOR

[75] Inventor: Erich Huber, München, Fed. Rep. of Germany

[73] Assignee: Schaltbau Gesellschaft mbH, München, Fed. Rep. of Germany

[21] Appl. No.: 721,615

[22] PCT Filed: Oct. 19, 1989

[86] PCT No.: PCT/EP89/01249
§ 371 Date: Jul. 22, 1991
§ 102(e) Date: Jul. 22, 1991

[87] PCT Pub. No.: WO90/09563
PCT Pub. Date: Aug. 23, 1990

[30] Foreign Application Priority Data
Feb. 15, 1989 [DE] Fed. Rep. of Germany ... 8901770[U]

[51] Int. Cl.$^5$ .............. G01B 7/14; G01N 27/00; F01B 25/26
[52] U.S. Cl. .............. 324/207.24; 324/207.13; 324/207.22; 92/5 R
[58] Field of Search .............. 324/207.13, 207.22, 324/207.24, 207.25, 207.26, 173, 174, 207.20, 207.21, 207.12; 92/5 R

[56] References Cited
U.S. PATENT DOCUMENTS
4,166,977 9/1979 Glauert et al. .............. 324/174
4,793,241 12/1988 Mano et al. .............. 324/207.24
4,994,338 2/1991 Soyck et al. .............. 324/207.26

Primary Examiner—Walter E. Snow
Attorney, Agent, or Firm—Nilles & Nilles

[57] ABSTRACT

A power actuator including a movable actuator member at the rear of a casing wall and has means for generating a magnetic field attached thereto, and a magnetic field sensor adapted to be mounted at the front of the casing wall. In order to permit the position of a piston to be detected even in the case of high-pressure cylinders having a magnetically shielding casing wall, the casing wall is made of a magnetically shielding material in which a magnetic main flux is created, and for creating a secondary magnetic flux, two magnetic conductors each having two ends are disposed on the front side of the casing wall with their first ends adjacent the casing wall and their second ends disposed opposite one another so as to define an air gap therebetween, the magnetic field sensor is mounted in the air gap between the two second ends.

20 Claims, 3 Drawing Sheets

POWER ACTUATOR INCLUDING MAGNETIC POSITION DETECTOR

BACKGROUND OF THE INVENTION

The invention relates to a power actuator comprising a movable actuator member disposed at the rear of a casing wall and having means for generating a magnetic field attached thereto, and a magnetic field sensor adapted to be mounted at the front of the casing wall.

Known from practical use are pneumatic power actuators of the type defined above in the form of so-called pneumatic cylinders. These pneumatic cylinders comprise a piston mounted for reciprocating within a cylinder casing and connected to a piston rod projecting from one end face of the cylinder casing. The cylinder wall of known pneumatic cylinders usually consists of non-ferrous metals such as bronze, aluminum or the like. Provided on the piston of such a pneumatic cylinder is a permanent magnet, the north pole-south pole axis of which is aligned substantially perpendicular to the cylinder wall. The lines of magnetic flux generated by the permanent magnet are able to penetrate the cylinder wall substantially unhindered. Provided on the outer side of the cylinder wall is a hall probe which is subjected to the action of the magnetic field of the permanent magnet when the piston is in a predetermined position. In this manner it is possible to detect the position of the piston in the pneumatic cylinder, so as to permit the operation of the pneumatic cylinder to be controlled or to be stopped at a predetermined position of the piston.

Also known from practical use are so-called hydraulic high-pressure cylinders. Their field of use ranges from elevator platforms to tracklaying vehicles etc. The space for the installation of such hydraulic high-pressure cylinders is often very restricted. It is nevertheless frequently desirable to include means for detecting the position of the piston in a hydraulic high-pressure cylinder. In contrast to pneumatic actuator cylinders, however, the cylinder wall of hydraulic high-pressure cylinders is usually made of steel. Steel is a magnetically conductive material and would therefore act to shield the magnetic field of a permanent magnet attached to the piston. There is also the fact that due to the enormous operating pressures, hydraulic high-pressure cylinders have relatively great wall thicknesses, so that it is no longer possible to detect a magnetic field of sufficient strength for a reliable control function on the outer side of the cylinder wall. It has therefore already been endeavoured to detect the piston position in hydraulic high-pressure cylinders by using other and much more sophisticated methods. All of these methods have in common that they are relatively expensive, and that the instalation space they require on the outer side of the cylinder wall is greater than frequently available.

OBJECTS AND SUMMARY OF THE INVENTION

It is therefore an object of the present invention to improve a power actuator of the type defined in the introduction so as to permit the position of the actuator member to be detected in a simple manner and without excessive structural expenditure even in the case of a magnetically shielding casing wall.

In order to attain this object, the invention provides that the casing wall is made of a magnetically conductive material in which the flux lines of the magnetic field form a main flux in the casing wall which is shielded from the outer surface of the casing wall, and that at least one two-ended magnetic conductor for generating a secondary magnetic flux is disposed on the outer surface of the casing wall with its first end adjacent the casing wall and its second end defining an air gap having the magnetic field sensor mounted therein.

In a particularly preferred embodiment of the invention, two magnetic conductors are provided and arranged in such a manner that their second ends oppose one another so as to define an air gap therebetween.

Even in the case of power actuators having a magnetically shielding casing wall, this solution permits the position of the actuator member to be detected in a simple manner. The magnetic field generated at the inner surface of the casing wall is deflected by the magnetically shielding material, which is always also a magnetically conductive material, so that the main magnetic flux is unavoidably formed in the casing wall without any flux lines exiting the front side of the casing wall. Since each of the magnetic conductors has one of its ends disposed adjacent the casing wall, the main flux formed in the casing wall is split so as to form a secondary flux in each magnetic conductor, so that a magnetic field is also genenated in the air gap between the second ends of the magnetic conductors. A magnetic field sensor disposed in the air gap detects variations of the magnetic field generated at this location in response to the position of the actuator member. A particular advantage of the power actuator according to the invention resides in the fact that the space required for the accommodation of the two magnetic conductors is rather insignificant, so that the field of use of power actuators of this kind is practically unlimited.

The advantages of the invention are particularly evident when the power actuator is a hydraulic high-pressure cylinder having an actuator member in the form of a piston connected to a piston rod, and the cylinder wall acting as the casing wall. This is because, specifically in the case of such hydraulic high-pressure cylinders, the solution according to the invention permits the otherwise rather sophisticated function of detecting the position of the piston to be accomplished in a particularly simple manner, in which context the invention makes specific use of the fact that the cylinder wall consists of a magnetically shielding material.

Although it would likewise be possible to use a solenoid for generating the magnetic field, the means for generating a magnetic field is preferably formed by a magnet, specifically a permanent magnet. The use of a permanent magnet offers the advantage that it is not necessary to provide electric connections leading into the power actuator itself.

The two magnetic conductors can be attached to the casing wall of the power actuator so as to offer a particularly low profile, when the second ends of the magnetic conductors overlap one another so as to define an air gap therebetween, so that the magnetic conductors and the magnetic field sensor form a bridge. This bridge can have a very low profile thanks to the overlapping ends of the magnetic conductor. The height of the bridge is determined by the thickness of the magnetic conductors and of the magnetic field sensor, which is usually a Hall probe or detector.

In order to permit a switching operation or the like to be triggered at different positions of the piston or of the actuator member, respectively, the bridge is preferably disposed in a protective housing adapted, with the aid of mounting means, to be attached to the high-pressure cylinder at a predetermined location. The protective housing in this case acts to protect the bridge from external influences.

In a particularly advantageous embodiment, the bridge is embedded in a cast insulating material acting as the protective housing. In this case the magnetic conductors need not be secured within the protective housing in any particular manner, since they are instead enclosed by the insulating material itself.

The secondary magnetic flux branched off by the magnetic conductors can be intensified in a simple manner by making the magnetic conductors of a dynamo sheet. This dynamo sheet displays increased permeability as compared to normal sheet material.

In this context it is particularly preferred to make the magnetic conductors of a sheet material having grain-oriented preferential directionality, since this sheet material is characterized by a permeability which is still higher than that of dynamo sheet material.

Although a secondary magnetic flux could be created in the magnetic conductors when their first ends are disposed at a very small spacing from the front side of the casing wall, this secondary magnetic flux will be considerably intensified when the first ends of the two magnetic conductors are in contact with the casing wall.

The secondary magnetic flux created in the magnetic conductors may also be intensified in an advantageous manner when the spacing between the first ends of the two magnetic conductors is smaller than or equal to the length of the magnetic main flux in the magnetically shielding casing wall. The length of the magnetic main flux in the magnetically shielding casing wall is substantially determined by the arrangement of the magnets provided on the actuator member. This length therefore remains unchanged for any actuator cylinder under consideration, regardless of the position of the actuator member. The displacement of the actuator member solely results in a displacement of the location, but not in a variation of the length, of the magnetic main flux created in the casing wall.

The bridge including the magnetic field sensor can be attached to the outer side of the power actuator or actuator cylinder, respectively, when the mounting means for the protective housing comprises at least one tensioning strap extending around the protective housing and the cylinder wall. When the tensioning strap is released, the protective housing enclosing the bridge can be shifted to another position on the power actuator, thus permitting a different piston position to be detected.

The protective housing may be secured to the cylinder wall in a particularly simple manner when the tensioning strap is in the form of a hose clip. Various types of hose clips are commercially available, and adapted to be readily released and tightened by using a screwdriver.

For creating the magnetic main flux in the casing wall, it is advantageous when the piston is made of a magnetically conductive material to dispose at least one permanent magnet on one of the two end faces of the piston. This results in the advantage that the length of the piston contributes to determine the length of the magnetic flux lines.

When in this case the north pole-south pole axis of the permanent magnet preferably extends substantially parallel to the casing wall, the length of the magnetic main flux in the casing wall will be determined by the length of the permanent magnet and the length of the piston. It is thus possible in a simple manner to create a magnetic main flux in the casing wall of a length which is always greater than the spacing between the first ends of the two magnetic conductors of the bridge.

In this context it is also advantageous when at least one permanent magnet is provided on each of the two end faces of the piston, so that in each case two permanent magnets are disposed opposite one another with their north pole-south pole axis pointing in the same direction. This results in that the length of the magnetic main flux created in the casing wall is still further extended.

A structurally particularly simple arrangement of the permanent magnets results when the north pole-south pole axes of the permanent magnets extend adjacent the casing wall. Although it may then happen that a magnetic flux of sufficient strength is not created over the full circumferential extent of the cylinder wall, this arrangement reqires the provision of only a single, relatively weak permanent magnet.

According to another embodiment, one end face of the piston may have a magnetically conductive body conforming to the peripheral contour of the piston secured thereto so as to define a space therebetween, with at least one permanent magnet disposed in this space. This construction results in the creation in the casing wall of a magnetic main flux extending in the direction of the cylinder axis and distributed symmetrically about the cylinder axis. This permits the bridge containing the magnetic field sensor to be mounted at any circumferential position on the cylinder wall.

Instead of using a single magnet, it is also possible to dispose a plurality of magnets on one side of the piston in circumferential distribution. In this manner it is also possible to create a magnetic main flux in the casing wall substantially symmetrical about the cylinder axis.

BRIEF DESCRIPTION OF THE DRAWINGS

Embodiments of the invention shall now be explained in more detail by way of example with reference to the accompanying drawings, wherein.

DETAILED DESCRIPTION OF THE PREFERRED EMBODIMENTS

Figure 1:
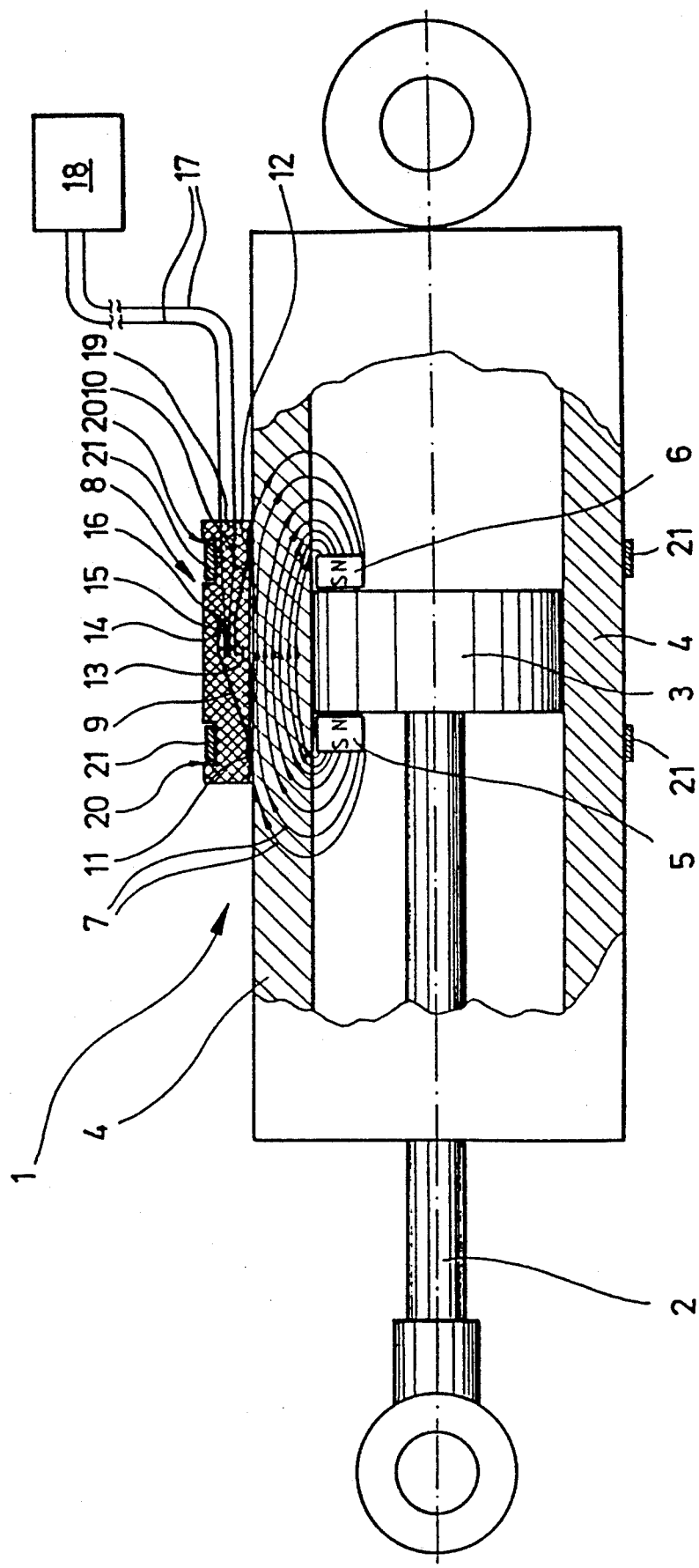
FIG. 1 shows a partially sectioned, diagrammatically illustrated sideview of a hydraulic high-pressure cylinder having a secondary flux bridge secured to its outer circumferential surface.

Shown in FIG. 1 is a power actuator in the form of a hydraulic high-pressure cylinder 1, with an actuator member in the form of a piston 3 connected to a piston rod 2 and mounted for reciprocating within high-pressure cylinder 1. The hydraulic connections of high-pressure cylinder 1 have not been represented for simplification of the illustration. The casing wall 4 of high-pressure cylinder 1 consists of magnetically shielding steel and has a wall thickness of about 10 mm.

Piston 3 has too oppositely directed end faces on which two permanent magnets 5 and 6 are disposed opposite one another. In this embodiment represented in FIGS. 1 and 2, the two permanent magnets 5 and 6 are disposed adjacent casing wall 4 with their respective axis pointing in the same direction.

As is evident from FIG. 1, a magnetic main flux is created in an upper part of casing wall 4 as illustrated by magnetic flux lines 7.

Disposed on the outer side of casing wall 4 is a magnetic secondary flux bridge 8 substantially consisting of two magnetic conductors 9 and 10. The two magnetic conductors 9 and 10 are aligned parallel to the cylinder axis and have their respective first ends 11 and 12 in contact with the outer side of casing wall 4. The respective second ends 13 and 14 of the two magnetic conductors 9 and 10 are directed towards one another and overlap each other so as to define an air gap 15 therebetween. Disposed in air gap 15 is a Hall probe or detector 16 connected viw conductors 17 to an evaluation unit 18. Magnetic conductors 9 and 10 and Hall probe 16 are enclosed in a protective housing 19 made of a cast insulating resin. The spacing between first ends 11 and 12 of the two magnetic conductors 9 and 10, respectively, is smaller than the length of the magnetic main flux created in casing wall 4, as illustrated in FIG. 1.

The top face of protective housing 19 is formed with recessed portions 20 for the accommodation of tensioning straps 21 extending around protective housing 19 and casing wall 4 of high-pressure cylinder 1. As is more clearly shown in FIG. 2, tensioning straps 21 are commercially available hose clips.

Figure 2:
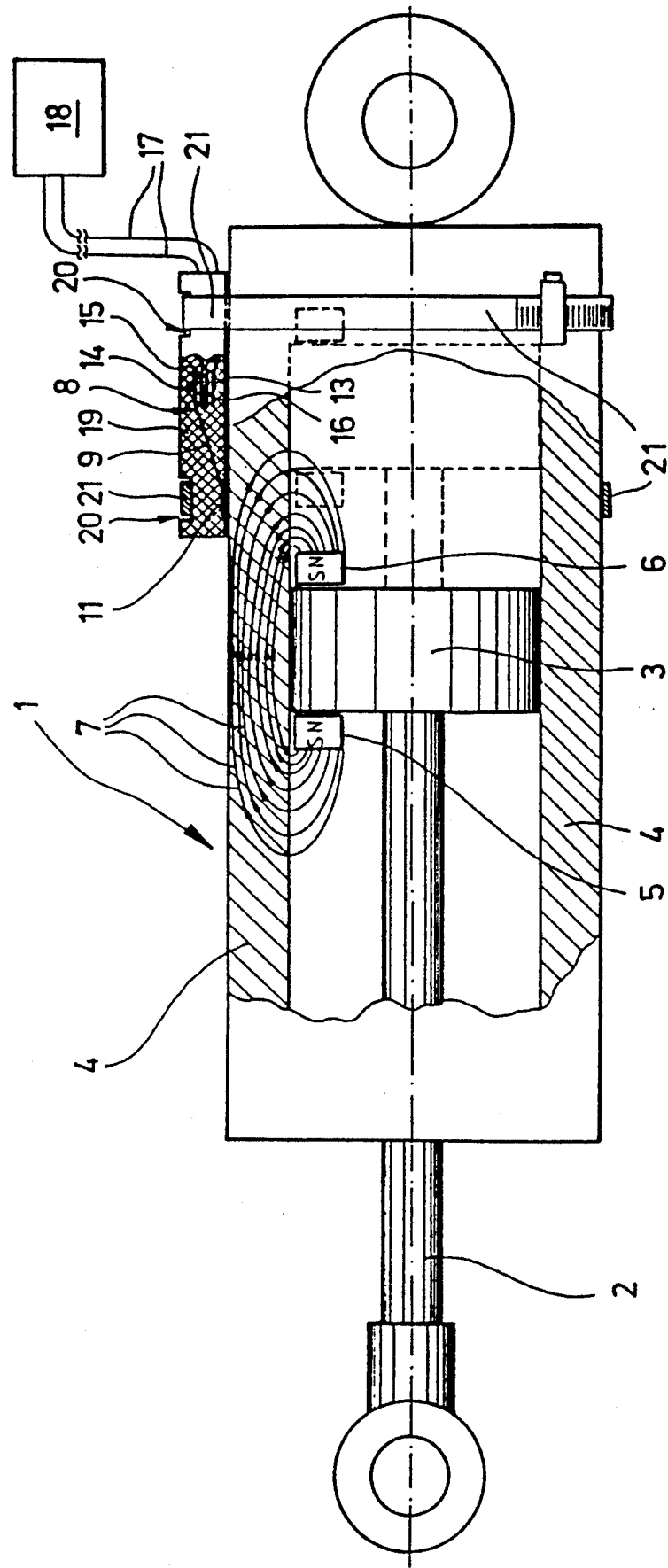
FIG. 2 shows the hydraulic high-pressure cylinder of FIG. 1 with the secondary flux bridge mounted at a displaced position.

The operation of the power actuator depicted in FIGS. 1 and 2 shall now be explained in more detail.

When piston 3 assumes a predetermined position relative to bridge 8 (cf. FIG. 1), in which magnetic conductors 9 and 10 extend parallel to the main flux created in casing wall 4, magnetic conductors 9 and 10, which preferably consist of dynamo sheet or of a magnetically soft sheet material having grain-oriented preferential directionality, act to divert part of the magnetic flux, so that a secondary magnetic flux is created in bridge 8. This results in a magnetic field being generated in air gap 15 between overlapping second ends 13 and 14 of magnetic conductors 9 and 10, respectively. The Hall detector disposed in air gap 15 detects this magnetic field and applies a corresponding signal to evalution unit 18 via conductor 17.

Displacement of piston 3 along the cylinder axis results in a variation of the strength of the magnetic field in air gap 15, this variation being similarly detected by Hall detector 16. The same occurs when bridge 8 enclosed in protective housing 19 is displaced along casing wall 4. This displacement can be accomplished in a simple manner by loosening tensioning straps 21, whereupon protective housing 19 can be shifted in the direction of the cylinder axis, for instance to the position shown in FIG. 2. As long as the piston 3 is subsequently not displaced, bridge 8 is then in a position in which it is incapable of diverting any significant secondary magnetic flux. A situation comparable to that shown in FIG. 1 is only established when piston 3 is displaced to the right to the position shown in dotted lines.

Instead of evaluation unit 18, it is also possible to provide a switching relay acting on a hydraulic valve controlling the supply of pressurized fluid to hydraulic high-pressure cylinder 1. In this manner bridge 8 may be used for causing the hydraulic high-pressure cylinder to be deactivated.

Figure 3:
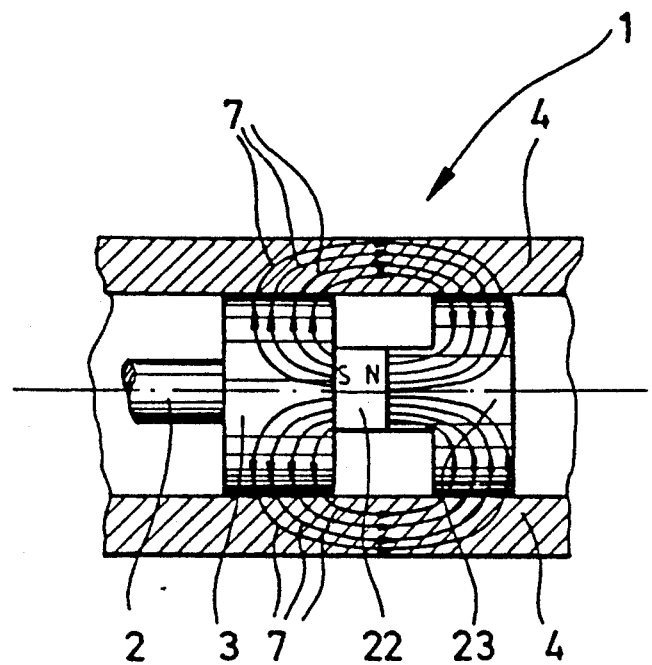
FIG. 3 shows a longitudinally sectioned view of parts of a high-pressure cylinder according to a first modification.

FIG. 3 shows a modification of the high-pressure cylinder of FIGS. 1 and 2. In this figure, the bridge has been omitted for clearer understanding. This modification differs from the high-pressure cylinder of FIG. 1 only by the constructon of means for creating a magnetic main flux in casing wall 4 of high-pressure cylinder 1. The modification illustrated in FIG. 3 thus comprises only a single permanent magnet 22 disposed on the end face of piston 3 opposite piston rod 2. Secured to the end face of permanent magnet 22 opposite piston 3 is a magnetically conductive body 23 formed as a solid of revolution of T-shaped cross-sectional configuration with its contour conforming to that of piston 3. In cooperation with piston 3, conductive body 23 causes magnetic flux lines 7 to be created in the manner shown in FIG. 3, so that a magnetic main flux of relatively great length is established in casing wall 4.

Figure 4:
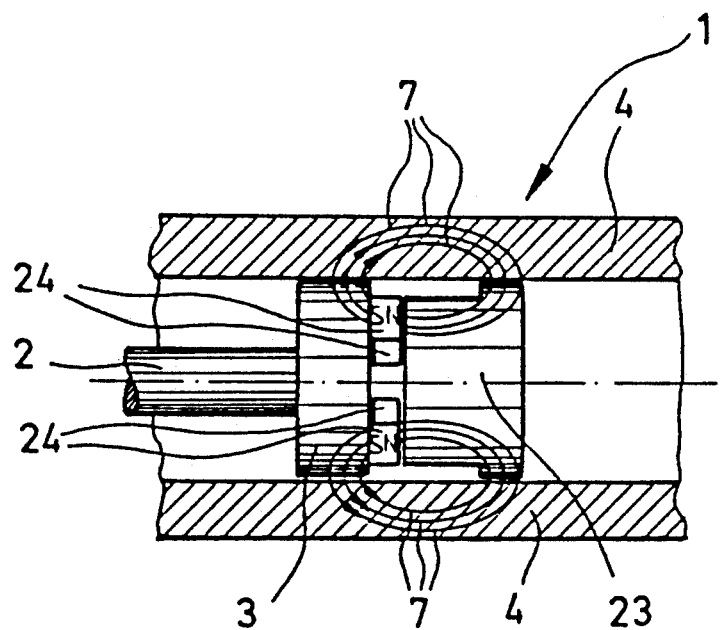
FIG. 4 shows a sectional view of parts of a hydraulic high-pressure cylinder according to a second modification.

A further modification is illustrated in FIG. 4. This modification differs from the one depicted in FIG. 3 by the provision of a plurality of permanent magnets 24 disposed at regular circumferential spacings on the end face of piston 3 opposite piston rod 2. The modifications both of FIGS. 3 and 4 have in common that the magnetic main flux created in casing wall 4 is symmetric about the cylinder axis. As a result, bridge 8 may be attached to casing wall 4 of high-pressure cylinder 1 at any suitable circumferential location for diverting the secondary magnetic flux for the generation of a deactivating or control signal. The remainder of the operation of the modifications according to FIGS. 3 and 4 corresponds to the operation of high-pressure cylinder 1 according to FIGS. 1 and 2.

It is of course also conceivable to dispose the Hall probe directly on the outer face of the cylinder wall, and to provide only a single magnetic conductor with its second end covering the rear face of the Hall probe. In this case, however, the secondary magnetic flux has to be expected to be of lesser strength, because the magnetic resistance will be increased due to the air gap facing the cylinder wall.

I claim:

1. A power actuator comprising:
   (A) a casing wall which has inner and outer surfaces and which is made of a magnetically conductive material;
   (B) a movable actuator disposed inside of said inner surface;
   (C) means, attached to said actuator, for generating a magnetic field forming a main flux in said casing wall which is normally shielded from said outer surface by said magnetically conductive material of said casing wall;
   (D) a magnetic flux conductor which has an inner end adjacent said outer surface of said casing wall and which has an air gap formed therein, said magnetic flux conductor generating a secondary magnetic flux when said movable actuator is disposed adjacent said magnetic flux conductor; and
   (E) a magnetic field sensor mounted in said air gap.

2. A power actuator according to claim 1, wherein said magnetic flux conductor comprises two conductor sections, each having an inner end located adjacent said outer surface of said housing and an outer end opposing and spaced from the outer end of the other conductor section to define said air gap therebetween.

3. A power actuator according to claim 2, wherein said outer ends of said conductor sections overlap one another to define said air gap therebetween such that said conductor sections form a bridge which diverts a portion of said main flux to generate said secondary magnetic flux.

4. A power actuator according to claim 3, further comprising a protective housing encasing said bridge and means for mounting said housing on said outer surface of said casing wall.

5. A power actuator according to claim 4, wherein said protective housing comprises a cast insulating material encasing said bridge.

6. A power actuator according to claim 4, wherein said mounting means comprises a tensioning strap extending around said protective housing and said casing wall.

7. A power actuator according to claim 6, wherein said tensioning strap comprises a hose clip.

8. A power actuator according to claim 2, wherein said means for generating a magnetic field generates a magnetic field forming a main flux extending a designated longitudinal distance through said casing wall, and wherein said inner ends of said conductor sections are spaced apart by a distance which is no greater than said designated longitudinal distance.

9. A power actuator according to claim 1, wherein said actuator comprises a hydraulic high-pressure cylinder including a piston and a piston rod, and wherein said casing wall comprises a cylinder wall of said high-pressure cylinder.

10. A power actuator according to claim 1, wherein said means for generating a magnetic field comprises a magnet.

11. A power actuator according to claim 10, wherein said magnet comprises a permanent magnet.

12. A power actuator according to claim 1, wherein said inner end of said magnetic flux conductor contacts said outer surface of said casing wall.

13. A power actuator according to claim 1, wherein
said actuator comprises a hydraulic high-pressure cylinder including a piston formed of a magnetically conductive material and having two end faces,
said casing wall comprises a cylinder wall of said high-pressure cylinder, and
said means for generating a magnetic field comprises a permanent magnet formed on one of said end faces of said piston.

14. A power actuator according to claim 13, wherein a north pole-south pole axis of said magnet is disposed substantially parallel to said casing wall.

15. A power actuator according to claim 14, further comprising another permanent magnet formed on the other end face of said piston.

16. A power actuator according to claim 15, wherein a north pole-south pole axis of each of said magnets extends in the same direction.

17. A power actuator according to claim 16, wherein north pole-south pole axes of said magnets are disposed adjacent to said casing wall.

18. A power actuator according to claim 1, further comprising a magnetically conductive body which is attached to said actuator, and wherein
said actuator comprises a hydraulic high-pressure cylinder including a piston formed of a magnetically conductive material and having two end faces,
said casing wall comprises a cylinder wall of said high-pressure cylinder,
said magnetically conductive body has a diameter substantially equal to that of said piston and is attached to said piston with a space therebetween, and
said means for generating a magnetic field comprises a permanent magnet disposed in said space between said piston and said magnetically conductive body.

19. A power actuator according to claim 18, wherein said means for generating further comprises a plurality of circumferentially spaced magnets provided in said space between said piston and said magnetically conductive body.

20. A method of detecting a movable actuator at a designated location within a casing wall, said casing wall being formed of a magnetically conductive material, said method comprising:
(A) generating a magnetic field via a magnet located on said movable actuator;
(B) forming a main flux in said casing wall which normally is shielded from an outer surface of said casing wall by said magnetically conductive material of said casing wall;
(C) generating a secondary magnetic field by diverting a portion of said main flux through a bridge, formed by first and second magnetic flux conductors located outside of said outer surface of said casing wall, when said movable actuator is located at said designated location; and then
(D) detecting said secondary magnetic field via a magnetic field sensor mounted in an air gap formed between said first and second magnetic flux conductors.

* * * * *